United States Patent [19]

Winkler

[11] 4,318,251
[45] Mar. 9, 1982

[54] INFLATABLE AND AUTOMATICALLY DEPLOYABLE HEAT BLANKET

[76] Inventor: Marshall N. Winkler, 146 South St., Rockport, Mass. 01966

[21] Appl. No.: 123,911

[22] Filed: Feb. 22, 1980

[51] Int. Cl.³ .............................................. E04B 1/34
[52] U.S. Cl. ............................................. 52/2; 47/17
[58] Field of Search ............................ 52/2, 83; 47/17

[56] References Cited

U.S. PATENT DOCUMENTS

| | | | |
|---|---|---|---|
| 254,265 | 2/1882 | Bone | 52/2 |
| 511,472 | 12/1893 | Sumovski | 52/2 |
| 2,782,794 | 2/1957 | White | 52/2 |
| 3,030,640 | 4/1962 | Gosman | 52/2 |
| 3,229,437 | 1/1966 | Adie | 52/2 |
| 3,249,682 | 5/1966 | Laing | 52/2 |
| 3,433,470 | 3/1969 | Erke | 52/2 |
| 3,481,073 | 12/1969 | Yoshida | 47/17 |
| 3,973,363 | 8/1976 | La Porte | 52/2 |
| 4,038,788 | 8/1977 | Claessens | 52/2 |

FOREIGN PATENT DOCUMENTS 2223158 11/1972 Fed. Rep. of Germany ............ 52/2
2522917 11/1976 Fed. Rep. of Germany ............ 52/2

Primary Examiner—Price C. Faw, Jr.
Assistant Examiner—Henry E. Raduazo
Attorney, Agent, or Firm—Jerry Cohen

[57] ABSTRACT

A heat blanket for building enclosures with large glazing areas, such as greenhouses and other solar-oriented buildings comprises a night time/inclement daytime blanket consisting of series of tube stacks, each tube in a stack being inflatable so that the inflation of tubes within the stacks and in turn within the series of stacks, causes the tube stacks to spread themselves to cover a large area and, in turn, deflation allows a ready compression of the stacks to a storage region. Generally, inflation and deflation involves movement of the stacks horizontally to provide an insulating roof. After inflation, the tubes are sealed and each stack provides a substantial inflating value of closed tubes, specific values being adjustable by adding one tube to a stack. The inflation value can be supplemented by making the space between tubes (from stack to stack and within stacks) a closed space as well, by selective use of reflection techniques and other adjustments.

4 Claims, 12 Drawing Figures

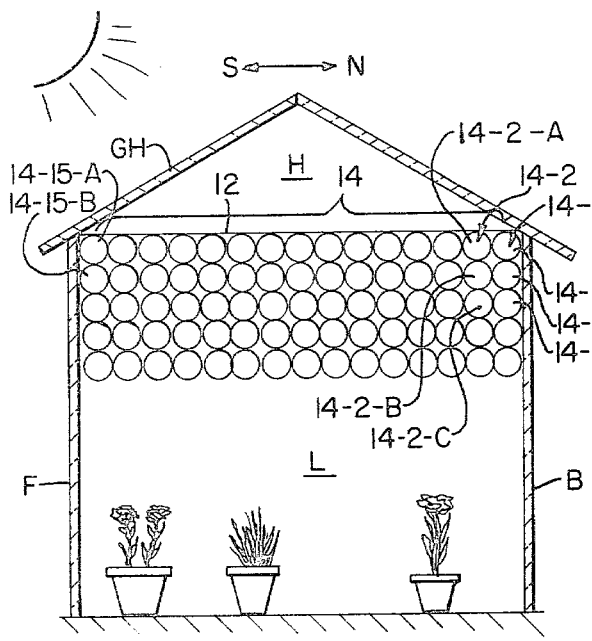
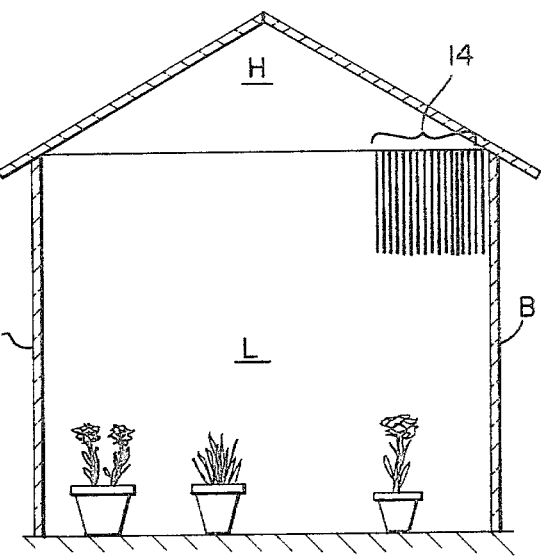
FIG. 1
FIG. 2
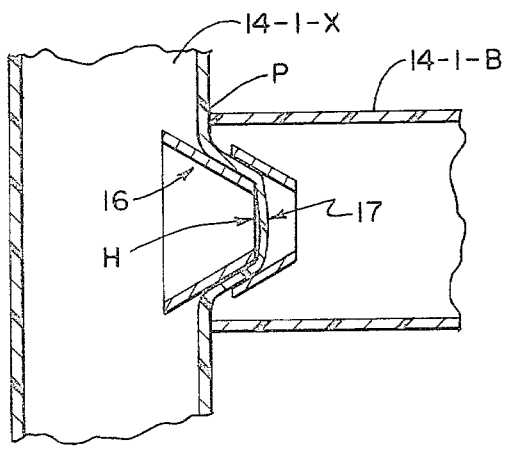
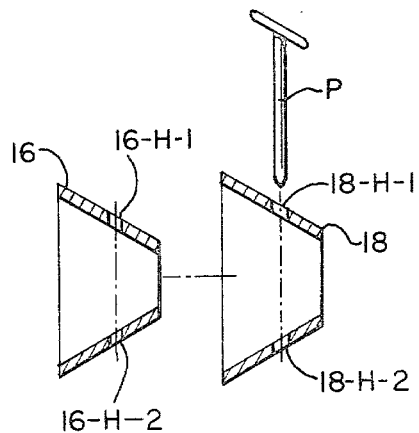
FIG. 3
FIG. 4
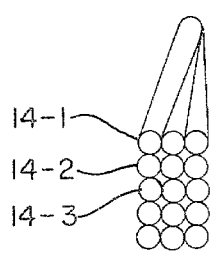
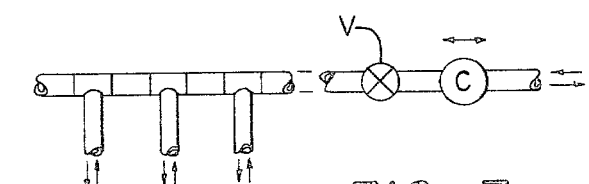
FIG. 6
FIG. 7

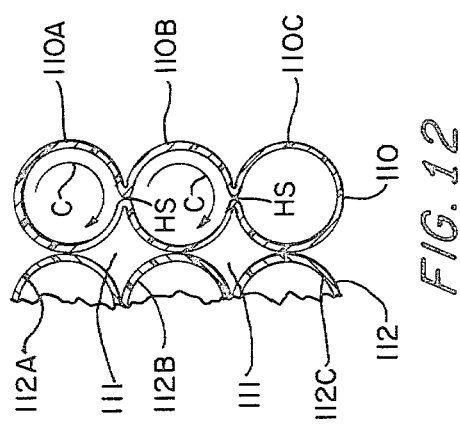
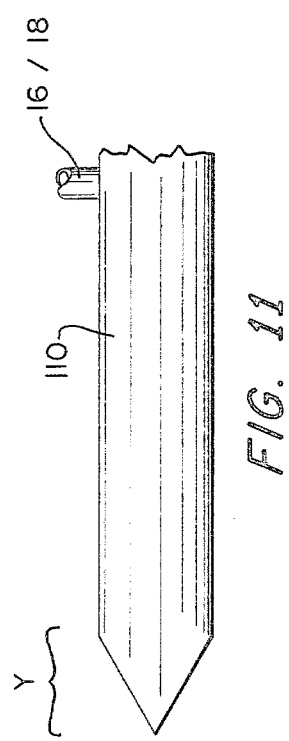
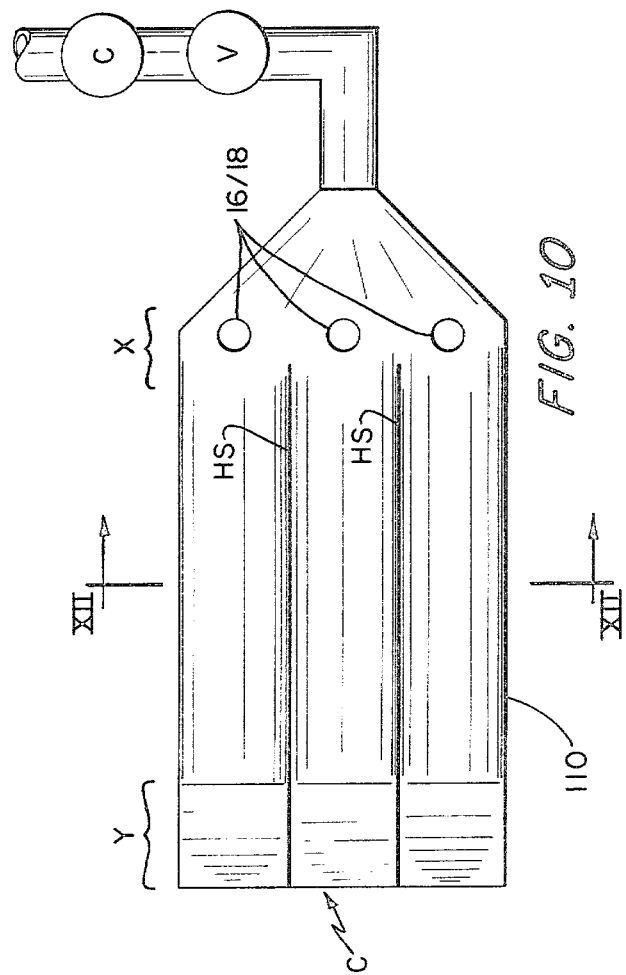

INFLATABLE AND AUTOMATICALLY DEPLOYABLE HEAT BLANKET

BACKGROUND OF THE INVENTION

The present invention relates to insulating building enclosures, particularly of the type having large glazing areas, such as greenhouses and other solar oriented buildings. As used herein, "glazing" refers not only to glass areas, but to other optically and/or infrared range transparent walled and/or roofed buildings and "buildings" as used herein includes vehicles as well as static structures and enclosures. The "glazing" may also include large area openings.

Within the greenhouse industry, there has been the longstanding recognition of the need to conserve energy and/or plant temperature at night by providing heat curtains which are stored on the north wall by day (a greenhouse usually runs east to west), such curtains being extended at night or on cloudy days to go across the lower part of the greenhouse and spread out to comprise a horizontal blanket. Such curtains and/or vertical curtains have also been used for artificial daylight control in connection with plant control purposes. The state of the art in terms of published disclosures is exemplified in U.S. Pat. Nos. 4,064,648, 4,027,437, 3,874,114, 3,481,073, 3,924,150, 3,249,682, and 2,193,921. But the principal products in the field (where any form of thermal curtain is used at all) are closest to those of the Gibbons and Yoshida disclosures (2,193,921 and 3,481,073, respectively).

It is an important object of this invention to provide an economical heat curtain of the class described, usuable in a variety of solar-oriented buildings as characterized above.

It is a further object of the invention to provide low capital and maintenance cost consistent with the preceding object.

It is a further object of the invention to provide ease of deployment and removal of the heat curtain, consistent with one or more of the preceding objects.

It is a further object of the invention to provide ease of adjustment of insulation value consistent with one or more of the preceding objects.

SUMMARY OF THE INVENTION

The objects of this invention are achieved by a structure comprising a series of tube stacks. To exemplify the present invention in connection with its application in a greenhouse mid-height expandable or deployable heat curtain, the stacks would run east-west (that is the tubes therein would run east-west) and such stacks would be arrayed in a series running from north to south. When retracted by deflation of the tubes, the stacks would all be up against each other and the northern-most stack thereof would be against the north wall of the house. By inflating all the tubes within a stack (or at least the topmost tube in each stack) and similarly inflating all the tubes (or at least the top most tubes) in the other stacks and by providing guide means such as cables running north-south, from which the stacks are loosely hung (e.g., by shower curtain type of runners) then inflation causes a deployment of the series of stacks across the mid-height region of the greenhouse. If a sufficient number of stacks are provided within the series, the whole mid-height region of the greenhouse is covered and the number of inflated tubes within each stack substantially determines the insulation value of the stack. Preferably long seam contacts (but point contact in cross section) are made between the tubes of such stack which are adjacent to each other within the stack and similarly between the side by side tubes of adjacent stacks. The tubes are inflatable as cylinders—and the diamond shaped virtual tubes formed between each four adjacent tubes becomes a closed tube. Each actual tube and virtual tube constitutes a closed air space with a locally recirculating convection loop. The combination of conductive and convective heat transfer path which must be traversed for heat loss to occur from the lower portion of the house to a higher portion is such that over 80% of usual heat loss of a greenhouse, at night, can be suppressed effectively.

Deflating the tubes causes a contraction of the curtain structure.

Insulation values can be controlled by adjusting the number of tubes in the stacks.

The heat curtain also provides a canopy which can be withdrawn or deployed selectively to define night and day artificially for plant control purposes.

Other objects, features and advantages of the invention will be apparent from the following detailed description thereof, taken in connection with preferred embodiments described in connection with the accompanying drawing, in which,

BRIEF DESCRIPTION OF THE DRAWING

FIGS. 1 and 2 are cross section views of a greenhouse with heat curtain of a preferred embodiment of the invention shown in deployed and retracted positions respectively;

FIG. 3 is an expanded view of a pari of tubes in adjacent stacks of such a heat curtain; and FIG. 4 is a cross section of one such tube, the figures illustrating a preferred means of interconnecting tubes for gas flow;

FIGS. 6–9 illustrate other embodiments of the invention, and more particularly FIG. 6 schematically shows a series of stacks and cross section utilizing separate stack inflation with FIG. 7 showing a common inflation and deflation tube;

FIG. 8 illustrates a variant tube stack arrangement of serpentine form;

FIG. 9 illustrates a variant from the preferred embodiment wherein the tube stacks for a greenhouse of variable arrangement wherein some tubes of a stack are inflated and others are not; and FIGS. 10, 11 and 12 are side, top and cross-section views of another preferred embodiment of the invention.

DETAILED DESCRIPTION OF PREFERRED EMBODIMENTS

Referring to FIGS. 1–3, there is shown a greenhouse GH, oriented in the usual east-west way so that there is a north back wall B and a south front wall F. In cross section, it is seen that below the peak of the roof, there is a high area H and a low growing area L. A number of cables 12 extend north-south across the house in the mid-height region thereof. Extended from such cables is the heat curtain 14 comprising a number of tube stacks 14-1, 14-2--14-5. Each such tube stack comprises tubes 14-1-A, 14-1-B, 14-1-C . . .; 14-2-A, 14-2-B . . . up to 14-15-A, 14-15-B . . .

There can be a manifold for each tube stack, e.g., as shown at 14-1-X for stack 14 in FIG. 3 (one manifold at the east or west ends or manifolds at both ends) or there can be no manifolds with the inflation being made of one tube of a stack while tube-to-tube connectors pass the inflation to other tubes in the same stack and/or to side tubes of adjacent stacks. Preferably the tube 14-1-A is inflated first and all the tubes are thus inflated via tube to tube connectors in stacks and side to side across adjacent stacks.

FIGS. 3-4 show such interconnection by nesting conical tubes 16 and 18 which can cut through the walls (or alternatively preliminary cuts can be made by other tooling before nesting the cones. FIG. 4 illustrates matching holes 16-H-1 and 16-H-2 provided in ly for alignment with similar holes 18-H-1 and 18-H-2 in 18 and a pin P which can be dropped through the aligned holes to hold the assemblage together with the hold defining edges of adjacent tubes (e.g., 14-1-A and 14-2-A side-to-side, or of 14-1-A to 14-1-B within a stack or of a closed end tube 14-1-B to a manifold 14-1-X as shown in FIG. 3) tightly secured between the nested conical tube members.

Figure 5:
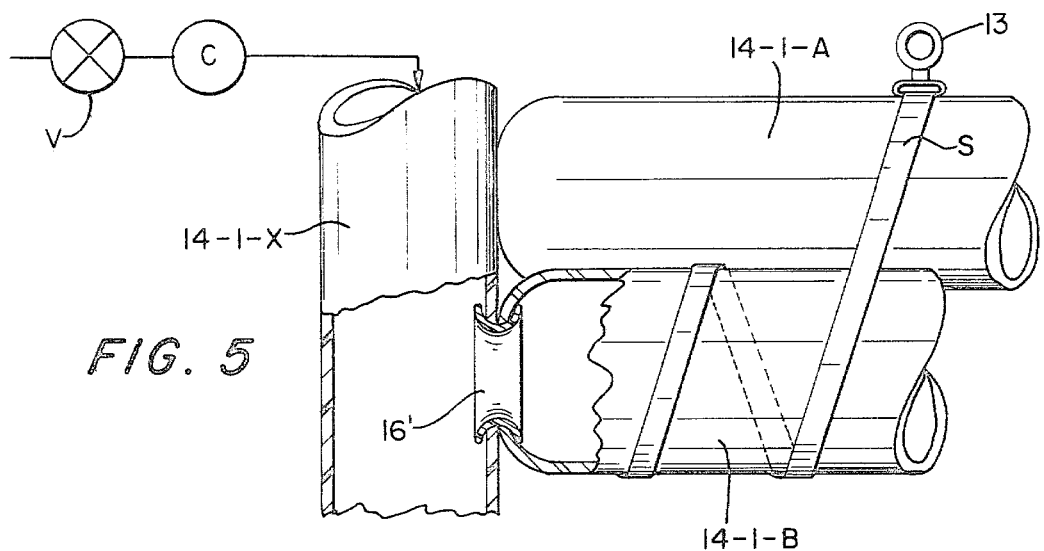
FIG. 5 is a tube stack lay-out for a preferred embodiment of such stacks.
Figure 8:
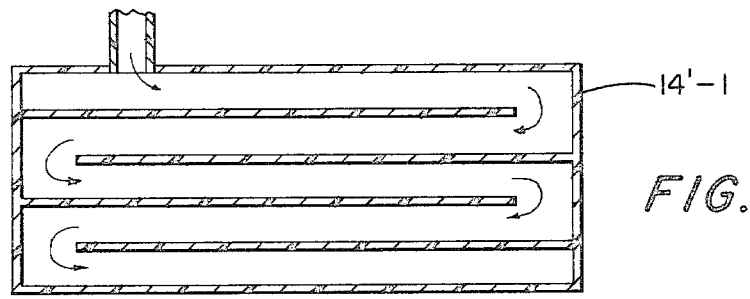
Figure 9:
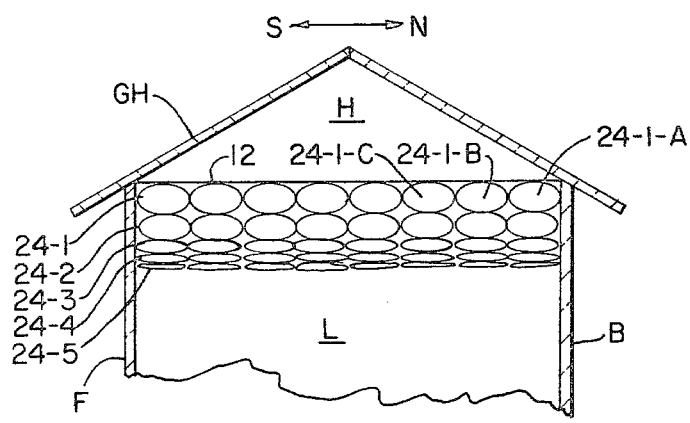

FIG. 5 illustrates a first preferred form of tube stack for 14-1 wherein manifolds 14-1-X is provided at the (east or west) end. The tube stack is filled by a compressor C and a valve V is utilized to seal off the tube stack after inflation. In alternative, another preferred form is indicated in FIG. 8 for a tube stack 14'-1 (serpentine series flow within each stack as exemplified by the single one shown). As FIG. 5 shows, a number of holes 17 formed by the connectors 16/18 may be provided from stack to stack and/or from tube to tube in each stack. A single compressor C can inflate many stacks. It is not necessary to provide a separate compressor for each stack of tubes. However, this can be done. As a middle ground, a single compressor can feed a tube and separate branch tubes therefrom can separately feed a number of stacks as indicated in FIGS. 6 and 7. FIG. 9 shows an arrangement in which selected tube of the stack are inflated and others are not (with necessary separate valving or compressor arrangements being provided to accomplish such selective inflation). Alternative to the degree of control indicated in FIG. 9, the number of tubes in a stack can be selected to provide selected insulating value and whatever tubes are provided can be interconnected within stacks and from stack to stack.

Strapping or tape of spiral wrap arrangement interconnects tubes within a stack in the alternative embodiment of FIG. 5 and carriers (e.g., as at 13) of low friction form (e.g., such as metal or plastic shower curtain ring) ride on cable 12 and suspend the tube stacks.

FIGS. 10-12 illustrate a portion of another preferred embodiment of the invention wherein large diameter tubes 110, 112, etc., are crimped and heat sealed longitudinally at HS for subdivision into stacked tubes 110A, 110B, 110C or 112A, 112B, 112C but leaving a manifold at end X and optionally at end Y (although no manifold is shown at Y in this instance). The tubes are also laterally sealed for closure C at ends X and Y except for tube 110—an endmost (northern) tube of an array of such tubes—wherein the end X is (directly or via transition pieces) connected to an air source compressor via a valve 8. Virtual tubes formed between adjacent stacks are indicated at 111. Arrows C show convective flow patterns. These tubes, as long as 6-18 inches in diameter, can be subdivided into 3-8 sub-tubes for effective insulation in accordance with the invention. Connectors 16/18, as described above, can provide air from the end X of tube 110 to corresponding end of tube 112 which can similarly pass air to more southerly tubes of the array.

The heat seal subdivision of large tubes provides a low cost, high production rate method of tube stack fabrication.

Tubes can be reflectively coated (e.g., by metallizing on the insides or outsides of plastic tube walls) to reflect heat (external or internal) for various thermal insulation or light control purposes.

The growing season of crops can be controlled by creating artificial days and nights using the readily deployable and retractable curtain described above in various embodiments. The curtain is repetitively and reliably so retractable and deployable over a long period, made of inexpensive materials and fully effective in meeting the above described objects.

It is evident that those skilled in the art, once given the benefit of the foregoing disclosure, may now make numerous other uses and modifications of, and departures from the specific embodiments described herein without departing from the inventive concepts. For instance, the cables 12 could run other than horizontal for special applications. Consequently, the invention is to be construed as embracing each and every novel feature and novel combination of features present in, or possessed by, the apparatus and techniques herein disclosed and limited solely by the scope and spirit of the appended claims.

What is claimed is:

1. Repetitively deployable and retractable insulation for building enclosures with large glazing areas comprising, means defining a parallel series of vertical stacks of elongatable tubes with the tubes of each stack being parallel to each other and horizontally elongated, each of said tubes being inflatable and deflatable, means for inflating and deflating said tubes, whereby the stacks spread as the tubes therein are inflated so that the series covers a large area and the stacks contracts as the tubes thereof are deflated to retract into a smaller storage area, and guide means extending substantially horizontally and non-parallel to the direction of horizontal elongation of the tubes and spanning the series of stacks and defining directions of expansion and retraction travel for the stacks as the tubes therein are inflated or deflated, respectively.

2. Apparatus in accordance with claim 1 wherein adjacent tubes within a stack are substantially simultaneously inflatable or deflatable using a common pump.

3. Apparatus in accordance with claim 1 wherein the guides comprise horizontally extending wires perpendicular to the tube stacks.

4. Apparatus in accordance with claim 1 wherein each stack is made of a single tube with longitudinal seals subdividing it into parallel sub-tubes.

* * * * *